(12) United States Patent
Nakashima

(10) Patent No.: US 7,508,090 B2
(45) Date of Patent: Mar. 24, 2009

(54) VEHICLE ENGINE CONTROL SYSTEM AND METHOD

(75) Inventor: Kazuhiro Nakashima, Obu (JP)

(73) Assignee: Denso Corporation, Kariya (JP)

( * ) Notice: Subject to any disclaimer, the term of this patent is extended or adjusted under 35 U.S.C. 154(b) by 361 days.

(21) Appl. No.: 11/404,017

(22) Filed: Apr. 14, 2006

(65) Prior Publication Data

US 2006/0255660 A1   Nov. 16, 2006

(30) Foreign Application Priority Data

May 13, 2005   (JP) ............................. 2005-141543

(51) Int. Cl.
*B60R 25/04* (2006.01)

(52) U.S. Cl. .................................... 307/10.3

(58) Field of Classification Search ................. 307/10.3
See application file for complete search history.

(56) References Cited

U.S. PATENT DOCUMENTS

| 6,653,747 | B1 | 11/2003 | Proefke et al. | |
| 2003/0090154 | A1* | 5/2003 | Takezaki et al. | 307/10.2 |
| 2004/0260432 | A1* | 12/2004 | Jackson | 701/1 |
| 2005/0173987 | A1* | 8/2005 | Shii | 307/10.5 |
| 2007/0200667 | A1* | 8/2007 | Matsubara et al. | 340/5.64 |

FOREIGN PATENT DOCUMENTS

| JP | 07-315171 | 12/1995 |
| JP | 09-136614 | 5/1997 |
| JP | 10-53108 | 2/1998 |
| JP | 11-91507 | 4/1999 |
| JP | 2000-104429 | 4/2000 |
| JP | 2001-206199 | 7/2001 |

OTHER PUBLICATIONS

Korean Office Action issued May 14, 2007 in corresponding Korean Application No. 10-2006-0042720, together with an English translation.

* cited by examiner

*Primary Examiner*—Stephen W Jackson
*Assistant Examiner*—Dru M Parries
(74) *Attorney, Agent, or Firm*—Nixon & Vanderhye P.C.

(57) ABSTRACT

When a driver of a vehicle issues a command to stop an engine, an in-vehicle unit communicates with a portable device. When collation of ID codes of the in-vehicle unit and the portable device is OK, a collation ECU permits stopping of the engine. When the result of ID-code collation is NG, the ECU prohibits stopping of the engine. When a vehicle passenger has taken out the portable device from a vehicle compartment, once the engine of the vehicle is stopped, the engine can no longer be restarted. By prohibiting the stop of the engine based on the NG result of ID-code collation, however, it is possible to prevent a state in which the engine cannot be restarted. It is preferred to allow starting of the engine irrespective of the ID code collation, when the ECU stores an engine stall occurring previously.

7 Claims, 2 Drawing Sheets

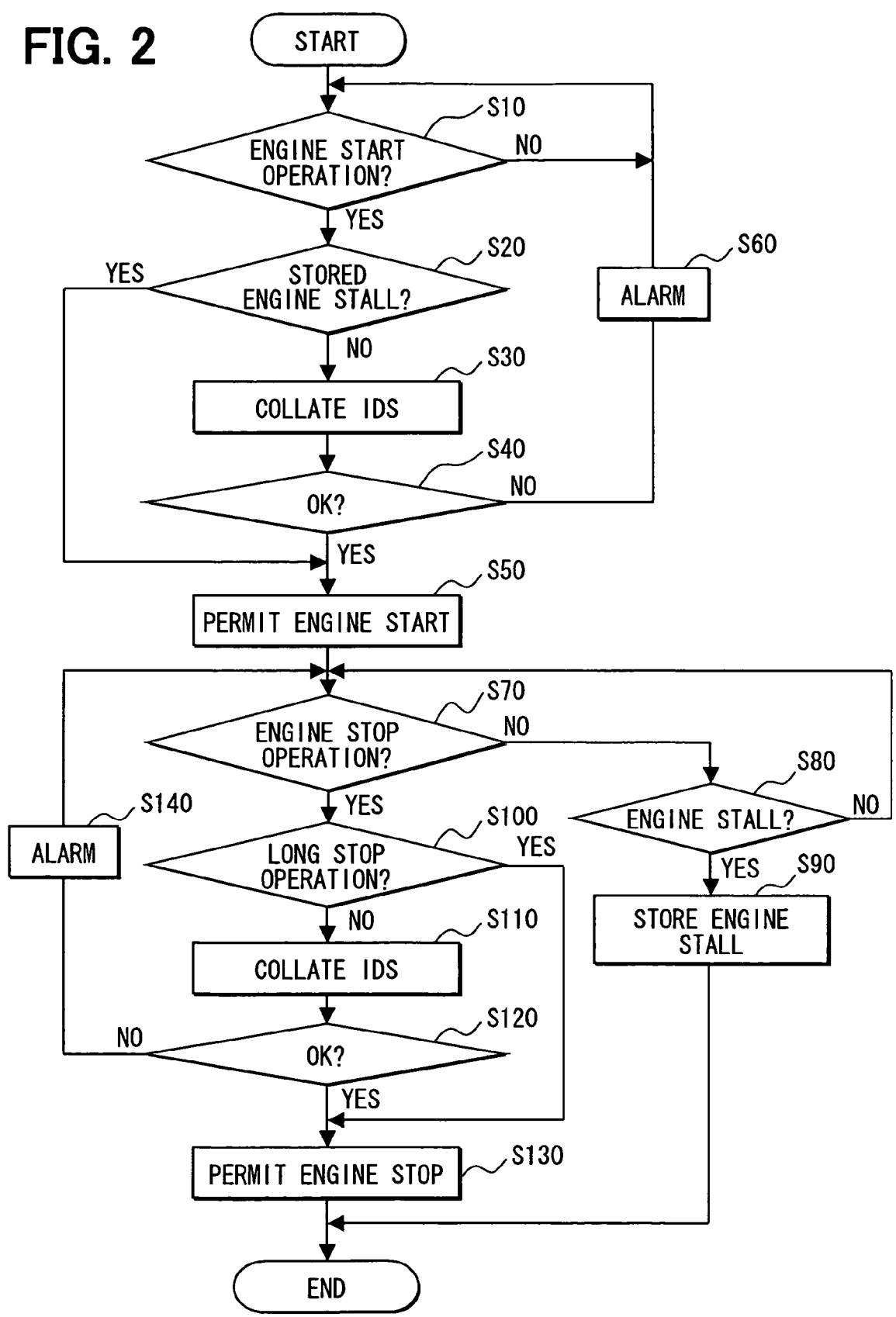

VEHICLE ENGINE CONTROL SYSTEM AND METHOD

CROSS REFERENCE TO RELATED APPLICATION

This application is based on and incorporates herein by reference Japanese Patent Application No. 2005-141543 filed on May 13, 2005.

FIELD OF THE INVENTION

The present invention relates to a vehicle engine control system and method in which an in-vehicle unit collates an ID code acquired by carrying out a communication with a portable device with a stored ID code and controls operations to start and stop an engine of a vehicle on the basis of a result of the collation.

BACKGROUND OF THE INVENTION

In order to enhance security preventing a vehicle from being stolen, an immobilizer function is installed in a vehicle security system. In this system, an in-vehicle unit collates with a stored ID code an ID code acquired from a portable device such as a portable electronic key carried by a user by carrying out communication with the portable device, and controls locking/unlocking states of vehicle doors on the basis of a result of the collation.

More specifically, at a location in close proximity to the seat of a driver in a vehicle, a switch to be operated to start and stop an engine of the vehicle is provided. When the switch is operated to start the engine of the vehicle from a stopped state, the in-vehicle unit makes an attempt to communicate with the portable device and compares and collates the ID code acquired from the portable device with a stored ID code. When the result of the collation is OK, the in-vehicle unit outputs a start permission signal to an engine ECU. Receiving the start permission signal, the engine ECU becomes capable of controlling ignition timing and fuel injection quantity. Thus, the engine ECU is capable of starting the engine of the vehicle. When the result of the collation is NG, on the other hand, the engine of the vehicle cannot be started because no fuel and no ignition spark are supplied in the engine.

In such a system, however, the user is capable of unlocking a door, getting into the vehicle and starting the engine of the vehicle without having a portable device. It is thus possible that the degree of awareness of the portable device decreases. For this reason, it is likely that the driver is not aware of the fact that a passenger has taken out the portable device from the vehicle with the engine of the vehicle kept operated. In such a case, when the engine of the vehicle is once stopped, the engine can no longer be restarted because the portable device is not in the vehicle compartment.

In order to solve this problem, with the vehicle in a rest state and a door of the vehicle is opened and closed, for example, the in-vehicle unit makes an attempt to communicate with the portable device by using a vehicle compartment transmitter in order to verify that the portable device exists in the compartment. When the in-vehicle unit fails in the attempt to verify that the portable device exists in the compartment, the in-vehicle unit issues an alarm or warning in order to prevent the portable device from being taken out from the vehicle.

In this system, however, when a portable device is about to be taken out from a vehicle, an alarm is merely issued. Thus, it is possible that a passenger takes out the portable device mistakenly from the vehicle if the passenger is not aware of the alarm. In such a case, once the engine of the vehicle is stopped, the engine can no longer be restarted thereafter. U.S. Pat. No. 6,653,747 proposes an improvement to this problem.

SUMMARY OF THE INVENTION

It is an object of the present invention to provide a vehicle engine control system and method which further improves an engine start and stop control performed based on communication between a portable device and an in-vehicle unit.

According to one aspect of the present invention, an engine in a vehicle is controlled based on communication between a portable device carried by a vehicle user and an in-vehicle unit mounted in the vehicle. The in-vehicle unit stores an engine stall when the engine stalls without an engine stop command of the user. The in-vehicle unit collates an ID code received from the portable device with a stored ID code when an engine start command is issued by the user. The in-vehicle unit permits starting of the engine when the ID code matches the stored ID code. The in-vehicle unit also permits starting of the engine in response to the engine stall stored in the in-vehicle unit irrespective of collation of the ID code with the stored ID code.

BRIEF DESCRIPTION OF THE DRAWINGS

The above and other objects, features and advantages of the present invention will become more apparent from the following detailed description made with reference to the accompanying drawings. In the drawings:

FIG. 2 is a flowchart representing processing carried out by a collation ECU and a body ECU to start and stop an engine of a vehicle on the basis of a result of ID code collation in the embodiment.

DETAILED DESCRIPTION OF THE PREFERRED EMBODIMENT

Figure 1:
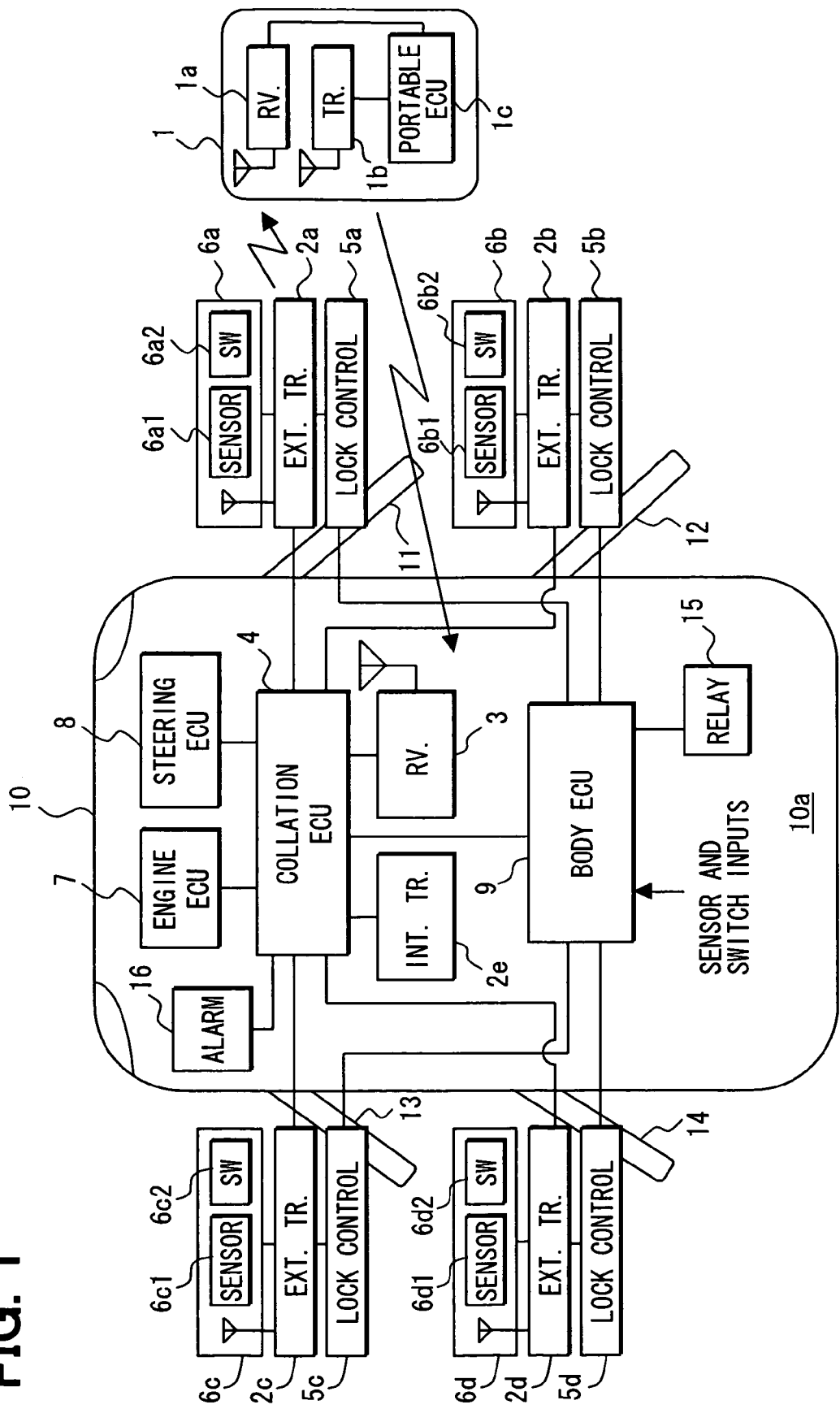
FIG. 1 is a schematic diagram showing a vehicle door control system according to an embodiment of the present invention.

Referring to FIG. 1, a vehicle door control system is constructed with a portable device 1 carried by a user and an in-vehicle unit 10a provided in a vehicle 10. The in-vehicle unit 10a is for controlling permission and prohibition (non-permission) of engine starting and stopping in order to enhance the security of the vehicle 10. The in-vehicle unit 10a is also for controlling locking of the steering wheel of the vehicle 10.

Specifically, the portable device 1 has a receiver 1a, a transmitter 1b and a portable-device ECU 1c. The receiver 1a is a radio receiver for receiving a request signal from one of vehicle exterior transmitters 2a to 2d or a vehicle interior transmitter 2e. The vehicle exterior transmitters 2a to 2d and the vehicle interior transmitter 2e are each a radio transmitter employed in the in-vehicle unit 10a. On the other hand, the transmitter 1b is a radio transmitter for transmitting a response signal including its ID code in response to a received request signal. The portable-device ECU 1c is an electronic control unit connected to the receiver 1a and the transmitter 1b and used for executing processing to control the receiver 1a and the transmitter 1b. On the basis of a signal received by the receiver 1a, the portable-device ECU 1c produces a result of determination whether a request signal has been received from one of the vehicle exterior transmitters 2a to 2d or the vehicle interior transmitter 2e so that a response signal including the ID code is transmitted from the transmitter 1b in response to the received request signal.

The in-vehicle unit 10a includes the vehicle exterior transmitters 2a to 2d, which are each installed on one of doors 11 to 14 of the vehicle 10, and the vehicle interior transmitter 2e installed in the compartment of the vehicle 10. The vehicle exterior transmitters 2a to 2d and the vehicle interior transmitter 2e each transmit a request signal on the basis of a transmission request signal issued by a collation ECU 4 employed in the in-vehicle unit 10a.

The propagation distance of a request signal transmitted by any one of the vehicle exterior transmitters 2a to 2d is set at a value in the range 0.7 to 1.0 meters. With the vehicle 10 at rest or in the parked state, communication areas each determined by the propagation distance of the request signal are formed periodically as areas each surrounding one of the doors 11 to 14 of the vehicle 10 so that a movement made by a holder of the portable device 1 as a movement approaching the vehicle 10 can be detected.

On the other hand, the communication area of the vehicle interior transmitter 2e is formed as an area covering the compartment of the vehicle 10 to check whether the portable device 1 is within the compartment when the engine of the vehicle 10 is started or stopped or the doors 11 to 14 are operated. The vehicle interior transmitter 2e is used as a transmitter for determining whether the portable device 1 exists in the compartment of the vehicle 10. It is to be noted that a plurality of such vehicle interior transmitters may also be provided. In this case, a total area of communication areas each formed by one of the vehicle interior transmitters is used as an area covering the compartment of the vehicle 10.

The in-vehicle unit 10a is installed in the compartment of the vehicle 10. The in-vehicle unit 10a includes a receiver 3 for receiving a response signal from the portable device 1. Specifically, synchronously with an operation carried out by one of the vehicle exterior transmitters 2a to 2d and the vehicle interior transmitter 2e to transmit a request signal, the receiver 3 is put in a state of being ready to receive a response signal transmitted by the portable device 1 in response to the request signal transmitted by any one of the vehicle exterior transmitters 2a to 2d and the vehicle interior transmitter 2e. This ready state is set in turn for each of the vehicle exterior transmitters 2a to 2d and the vehicle interior transmitter 2e. A response signal received by the receiver 3 is supplied to the collation ECU 4.

The collation ECU 4 then collates an ID code included in the response signal with an ID code stored in advance in the collation ECU 4 in order to determine whether the ID code of the response signal is in a predetermined relation with the stored ID code. The ID code of the response signal varies from device to device and the ID code stored in the collation ECU 4 varies from unit to unit. Typically, the collation ECU 4 produces a result of determination whether the ID code of the response signal matches the stored ID code. Then, the collation ECU 4 supplies a control signal to a body ECU 9 as a signal for controlling locking and unlocking states of the doors 11 to 14 in dependence on whether the result of the determination is OK or NG (not good).

The body ECU 9 is for controlling operations to supply and stop power from a power supply as power for driving apparatus mounted in the vehicle 10. The body ECU 9 also outputs driving signals to lock control sections 5a to 5d installed on the doors 11 to 14 respectively as signals for controlling the locking and unlocking states of the doors 11 to 14.

The body ECU 9 receives signals from sensors and switches (SW) as signals used for producing a result of determination whether a condition for starting the engine of the vehicle 10 is satisfied. Provided at a location in close proximity to the seat of a driver, the body ECU 9 receives signals from sources including an engine switch, a vehicle speed sensor, a shift position sensor and a stop lamp switch. The engine switch is operable by the user to start or stop the engine of the vehicle 10. The vehicle speed sensor detects the traveling speed of the vehicle 10. The shift position sensor detects the shift position of a transmission. The stop lamp switch outputs an ON signal indicating that a brake is depressed.

When the determination result produced by the body ECU 9 reveals that the condition for starting the engine of the vehicle 10 is satisfied and power is to be supplied to the apparatus mounted on the vehicle 10, a relay circuit 15 is driven so that power generated by a battery (not shown) can be supplied to the apparatus by way of the relay circuit 15.

In addition, the in-vehicle unit 10a has the lock control sections 5a to 5d provided on the respective doors 11 to 14 of the vehicle 10 as controllers for locking and unlocking the doors 11 to 14 respectively. Specifically, the lock control sections 5a to 5d each have a door lock motor rotating in the normal or opposite direction in accordance with a lock signal or unlock signal received from the body ECU 9. Then, the rotation of the door lock motor provided for any specific one of the doors 11 to 14 locks or unlocks the specific door.

The doors 11 to 14 of the vehicle 10 have door handles 6a to 6d, respectively. Touch sensors 6a1 to 6d1 are installed on the door handles 6a to 6d, respectively. When the holder of the portable device 1 touches any specific one of the door handles 6a to 6d, the touch sensor 6a1 to 6d1 installed on the specific one of the door handles 6a to 6d is capable of detecting the operation to touch the specific one of the door handles 6a to 6d. Door lock switches 6a2 to 6d2 are also installed on the door handles 6a to 6d, respectively. The door lock switches 6a2 to 6d2 are each a push switch. When any specific one of the door lock switches 6a2 to 6d2 is operated, the doors 11 to 14 are locked. In addition, the door handles 6a to 6d also function as antennas of the vehicle exterior transmitters 2a to 2d respectively.

The following description explains control to unlock and lock the doors 11 to 14 in accordance with the vehicle door control system described above.

When the engine of the vehicle 10 is stopped and the vehicle 10 is parked with the doors 11 to 14 put in a locked state, the collation ECU 4 requests each of the vehicle exterior transmitters 2a to 2d to transmit a request signal every time a predetermined period lapses in order to determine whether the holder of the portable device 1 has approached the vehicle 10.

The request signal transmitted by any specific one of the vehicle exterior transmitters 2a to 2d includes an ID code unique to the specific one of the vehicle exterior transmitters 2a to 2d and, in response to the request signal, the portable device 1 transmits a response signal conveying the same ID code. Thus, it is possible to determine whether the holder of the portable device 1 has approached one of the doors 11 to 14 of the vehicle 10. It is to be noted that, in order to determine which of the doors 11 to 14 has been approached by the holder of the portable device 1, the collation ECU 4 may request the vehicle exterior transmitters 2a to 2d to transmit request signals sequentially with their timings shifted from each other.

When the portable device 1 transmits a response signal in response to a request signal transmitted by any specific one of the vehicle exterior transmitters 2a to 2d, the receiver 3 in the in-vehicle unit 10a receives the response signal. Then, the collation ECU 4 collates the ID code included in the response signal with a ID code stored in order to determine whether the ID code included in the response signal is in a predetermined relation with the stored ID code. Typically, the collation ECU 4 produces a result of determination whether the ID code included in the response signal matches the stored ID code.

When the collation ECU 4 produces an OK determination result indicating that the ID code included in the response signal matches the stored ID code, the collation ECU 4 then recognizes the position of the holder of the portable device 1 from the ID code included in the response signal. Subsequently, the collation ECU 4 requests the body ECU 9 to activate a specific one of the touch sensors 6a1 to 6d1 installed on a corresponding specific one of the vehicle doors 11 to 14, which is closest to the position of the holder of the portable device 1, in order to put the specific one of the doors 11 to 14 in an unlock-standby state. At the request made by the collation ECU 4, the body ECU 9 puts the specific one of the doors 11 to 14 in an unlock-standby state.

When the holder of the portable device 1 touches the specific one of the door handles 6a to 6d installed on the specific one of the doors 11 to 14 set in the unlock-standby state, the operation carried out by the holder of the portable device 1 to touch the specific one of the door handles 6a to 6d is detected by the specific one of the touch sensors 6a1 to 6d1 installed on the specific one of the door handles 6a to 6d, and the specific one of the touch sensors 6a1 to 6d1 transmits a detection signal to the collation ECU 4. Receiving the detection signal, the collation ECU 4 generates a command signal to the body ECU 9 to unlock all the doors 11 to 14 of the vehicle 10. Then, in accordance with the command signal, the body ECU 9 supplies unlock driving signals to the lock control sections 5a to 5d associated respectively with the doors 11 to 14 of the vehicle 10 to unlock the vehicle doors 11 to 14.

When the holder of the portable device 1 gets off the vehicle 10 after the vehicle 10 is halted and the engine switch is turned off and an operation carried out on any specific one of the door lock switches 6a2 to 6d2 provided on the door handles 6a to 6d respectively is detected, the collation ECU 4 uses the vehicle exterior transmitters 2a to 2d and the vehicle interior transmitter 2e to make an attempt to carry out communication with the portable device 1. When a result of compartment interior collation is NG indicating that no response signal was received in response to a request signal transmitted by the vehicle interior transmitter 2e but a result of compartment exterior collation is OK indicating that a response signal has been received in response to a request signal transmitted by any one of the vehicle exterior transmitters 2a to 2d and indicating that a result of collation of ID codes is also OK, the holder of the portable device 1 can be regarded to have gotten off to the outside of the compartment of the vehicle 10.

Thus, in this case, the collation ECU 4 outputs a command signal to the body ECU 9 to lock all the doors 11 to 14 of the vehicle 10 since it is not likely that the portable device 1 is confined in the compartment of the vehicle 10. In accordance with the command signal received from the collation ECU 4, the body ECU 9 outputs lock driving signals to the lock control sections 5a to 5d provided for the vehicle doors 11 to 14 respectively to lock the doors 11 to 14 of the vehicle 10.

In the vehicle door control system described above, in order to enhance the security of the vehicle 10, when the engine switch is operated, the start of the engine is permitted or prohibited in accordance with a result of collation of ID codes and the locked steering state is continued or discontinued also in accordance with the result of the collation. That is, the collation ECU 4 in the in-vehicle unit 10a is connected to the engine ECU 7 for controlling the operating state of the engine and a steering lock ECU 8 for controlling the state of the steering. The collation ECU 4 outputs control signals to the engine ECU 7 and the steering lock ECU 8 also in accordance with a result of the collation of ID codes. It is to be noted that, in execution of door lock control, the collation ECU 4 also requests the engine ECU 7 to set a state of prohibiting the starting of the engine as well as requests the steering lock ECU 8 to set a state of locking the steering wheel.

In addition, the collation ECU 4 is also connected to an alarm or alarm apparatus 16. When an NG result of the ID-code collation is obtained at the time the engine is started or stopped, the alarm apparatus 16 outputs a display or a sound as a warning indicating absence of the portable device 1 in the compartment of the vehicle 10 on the basis of a command issued by the collation ECU 4.

Control processing carried out by the collation ECU 4 to start and stop the engine is described with reference to FIG. 2 as a characteristic of the embodiment.

The processing begins with step S10 to make a determination whether the engine switch has been operated by the driver to start the engine of the vehicle 10 from the stop state of the engine. When the determination result at step S10 indicates that the engine switch has been operated by the driver to start the engine, the control processing proceeds to step S20.

In order to start the engine with a high degree of safety, in addition to the process to determine whether the engine switch has been operated by the driver to start the engine, it is preferable to carry out also other processes at step S10 such as a process to confirm that the speed of the vehicle 10 is zero, the shift position of the transmission is the neutral or parking position and the brake pedal is being depressed on the basis of signals received from a variety of sensors and switches.

At step S20, a determination is made whether an engine-stall event has been stored in a memory in order to determine whether the engine has been stopped due to an engine stall. A process to store the engine-stall event stored in a memory will be described later. When the determination result at step S20 indicates that no engine-stall event has been stored in a memory, the control processing proceeds to step S30 at which communication with the portable device 1 is carried out by using the vehicle interior transmitter 2e and, then, an ID code (first ID code) included in a response signal received from the portable device 1 is collated with an ID code stored in advance.

Then, the control processing proceeds to step S40 to determine whether the result of the ID-code collation is OK indicating that the ID codes match or that the portable device 1 is an authorized one. When the result of determination indicates that the result of the ID-code collation is OK, the control processing proceeds to step S50 at which a start permission signal is output to the engine ECU 7 as a signal to permit the start of the engine. When the determination result at step S40 indicates that the result of the ID-code collation is NG, on the other hand, the control processing proceeds to step S60 at which an alarm is generated as a warning indicating nonexistence of the portable device 1 in the compartment of the vehicle 10. Thus, the driver is capable of recognizing the reason why the engine cannot be started. Then, the control processing returns to step S10. Thus, when the result of the ID-code collation is NG, the state to prohibit the start of the engine is sustained.

When the determination result at step S20 indicates that an engine-stall event occurring previously has been stored in the memory, on the other hand, the control processing proceeds to step S50 at which a start permission signal is output to the engine ECU 7. That is, when the engine of the vehicle 10 has been put in a stopped state due to an engine stall, the start of the engine is permitted without regard to the result of the ID-code collation, that is, the start of the engine is permitted without collating ID codes. Thus, when the engine of the vehicle 10 has been put in a stopped state due to an engine stall, the engine can be restarted even when a passenger has taken out the portable device 1 to the outside of the vehicle 10.

Then, the control processing proceeds to step S70 to determine whether the driver has operated the engine switch in order to stop the engine of the vehicle 10 while the engine was operating. When the determination result at step S70 indicates that the driver has not operated the engine switch, the control processing proceeds to step S80. A process is carried out at step S80 to determine whether the speed of the engine has decreased to a predetermined value or to a value smaller than the predetermined value to result in an engine stall on the basis of a detection signal generated by an engine-speed sensor for detecting the speed of the engine. When the determination result at step S80 indicates that an engine stall has been generated, the control processing proceeds to step S90 at which the event of the engine stall is stored in the memory. Then, execution of the control processing is ended. As described above, the determination process at step S20 is based on this stored event of the engine stall.

When the determination result at step S70 indicates that the driver has operated the engine switch, on the other hand, the control processing proceeds to step S100 to determine whether the operation is an ordinary command operation to stop the engine or a forcible engine stop command operation to forcibly stop the engine. The result of the determination is produced on the basis of the length of the duration of the operation carried out on the engine switch. In this embodiment, when the length of the duration of the operation carried out on the engine switch is found shorter than a predetermined value, the result of the determination indicates that the operation carried out on the engine switch is an ordinary command operation to stop the engine of the vehicle 10. When the length of the duration of the operation carried out on the engine switch is found at least equal to the predetermined value, on the other hand, the result of the determination indicates that the operation carried out on the engine switch is a forcible engine stop command operation to forcibly stop the engine of the vehicle 10.

When the determination result at step S100 indicates that the operation carried out on the engine switch is an ordinary command operation to stop the engine of the vehicle 10, the control processing proceeds to step S110 at which a process to collate ID codes is carried out in the similar way as the process performed at step S30. In this process, the in-vehicle unit 10*a* requests and receives ID code from the portable device 1 as the second ID code. Then, the control processing proceeds to step S120 to determine whether the result of the ID-code collation is OK.

When the result of determination indicates that the result of the ID-code collation is OK, the control processing proceeds to step S130 at which a stop permission signal is issued to the engine ECU 7 as a signal permitting the stop of the engine. When the determination result at step S120 indicates that the result of the ID-code collation is NG, on the other hand, no stop permission signal is issued to the engine ECU 7. Instead, the control processing proceeds to step S140 at which an alarm is generated as a warning indicating nonexistence of the portable device 1 in the compartment of the vehicle 10. Thus, the driver is capable of recognizing the reason why the engine cannot be started. Then, the control processing goes back to the step S70.

As described above, in this embodiment, when the driver tries to stop the engine of the vehicle 10, the in-vehicle unit 10*a* and the portable device 1 communicates with each other. When the communication produces an OK result of ID-code collation, the collation ECU 4 permits the stop of the engine of the vehicle. When the communication produces an NG result of ID-code collation, on the other hand, the collation ECU 4 prohibits the stop of the engine of the vehicle.

When a passenger has taken out the portable device 1 from the compartment of the vehicle 10, the in-vehicle unit 10*a* is not capable of communicating with the portable device 1. In this case, since the collation ECU 4 produces an NG result of ID-code collation, the collation ECU 4 prohibits the stop of the engine of the vehicle 10. That is, when a passenger has taken out the portable device 1 from the compartment of the vehicle 10, the collation ECU 4 prohibits the stop of the engine of the vehicle 10 because, once the engine of the vehicle 10 is stopped, the engine can no longer be restarted. It is thus possible to prevent a state in which the engine of the vehicle 10 cannot be restarted.

In a situation that the vehicle 10 is to be parked at a garage of a home of a driver, however, the engine of the vehicle 10 may be stopped even when the portable device 1 does not exist in the compartment of the vehicle 10, or it may be preferable to stop the engine in some cases. Therefore, when the determination result at step S100 indicates that the operation carried out on the engine switch is a forcible engine stop command operation to forcibly stop the engine of the vehicle 10, the control processing proceeds directly to step S130 without carrying out the processes of the steps S110 and S120. At step S130, a stop permission signal is issued to the engine ECU 7 as a signal permitting the stop of the engine. Thus, the driver is capable of stopping the engine of the vehicle 10 even when the portable device 1 does not exist in the compartment of the vehicle 10.

It is to be noted that, in this embodiment, when the length of the duration of the operation carried out on the engine switch is found equal to or longer than the predetermined value, the result of the determination indicates that the operation carried out on the engine switch is a forcible engine stop command operation to forcibly stop the engine of the vehicle 10. This mode of forcible engine stop command operation is different from that of the normal engine stop command operation. Thus, the embodiment can eliminate the need to provide an operation switch to be specially used as a switch to carry out a forcible engine stop command operation. However, the forcible engine stop command operation does not have to be an operation of such a long operation duration. For example, the forcible engine stop command operation can also be an operation carried out intermittently at least a predetermined number of times as long as the operation mode is differentiated from that of the normal operation mode of stopping the engine.

The above embodiment may be modified in various ways. For instance, a plurality of ECUs such as ECUs 4 and 9 in the in-vehicle unit 10*a* may be integrated into a single ECU. In addition, the in-vehicle unit 10*a* having the functions of the collation ECU 4 and the body ECU 9 can also be implemented by a larger number of ECUs.

What is claimed is:

1. A vehicle engine control method for controlling an engine in a vehicle based on communication between a portable device carried by a vehicle user and an in-vehicle unit mounted in the vehicle, the method comprising:

storing an engine stall in the in-vehicle unit when the engine stalls without an engine stop command of the user;

collating a first ID code received from the portable device with an ID code stored in the in-vehicle unit when an engine start command is issued by the user;

permitting starting of the engine when the first ID code matches the stored ID code; and permitting starting of the engine in response to the engine stall stored in the in-vehicle unit irrespective of collation of the first ID code with the stored ID code.

2. The vehicle engine control method according to claim 1, further comprising:

collating a second ID code received from the portable device with the stored ID code when an engine stop command is issued by the user;

determining whether the engine stop command is issued in a normal mode or in a different mode from the normal mode;

permitting stopping of the engine when the second ID code matches the stored ID code if the engine stop command is issued in the normal mode; and permitting stopping of the engine irrespective of collation of the second ID code with the stored ID code when the engine stop command is issued in the different mode.

3. A vehicle engine control system for controlling an engine in a vehicle based on communication between a portable device carried by a vehicle user and an in-vehicle unit mounted in the vehicle, the vehicle engine control system comprising:

storing means provided in the in-vehicle unit to store an engine stall therein when the engine stalls without an engine stop command of the user;

collating means provided in the in-vehicle unit to collate a first ID code received from the portable device with an ID code, which is stored in the in-vehicle unit, when an engine start command is issued by the user; and permitting means provided in the in-vehicle unit to permit starting of the engine when the first ID code matches the stored ID code, and to permit starting of the engine in response to the engine stall stored in the storing means irrespective of collation of the first ID code with the stored ID code.

4. The vehicle engine control system according to claim 3, further comprising:

collating means provided in the in-vehicle unit to collate a second ID code received from the portable device with the stored ID code when an engine stop command is issued by the user; and determining means provided in the in-vehicle unit to determine whether the engine stop command is issued in a normal mode or in a different mode from the normal mode;

permitting means provided in the in-vehicle unit to permit stopping of the engine when the second ID code matches the stored ID code if the engine stop command is issued in the normal mode, and to permit stopping of the engine irrespective of collation of the second ID code with the stored ID code when the engine stop command is issued in the different mode.

5. The vehicle engine control system according to claim 3, further comprising:

forcible stop means provided in the in-vehicle unit to be operated by a user to output a forcible stop signal for forcibly stopping the engine without regard to a result of collation of a second ID code received from the portable device with the stored ID code, wherein the forcible stop means is configured to permits stopping of the engine in response to the forcible stop signal without regard to collation of the second ID code with the stored ID code.

6. The vehicle engine control system according to claim 5, further comprising:

a stop request switch provided in the vehicle an operable by the user, wherein the forcible stop means outputs the forcible stop signal, when a forcible stop operation different from an ordinary operation for stopping the engine is carried out on the stop request switch for issuing a stop command.

7. The vehicle engine control system according to claim 4, further comprising:

an alarm means provided in the in-vehicle unit to output an alarm indicating nonexistence of the portable device in the vehicle when the second ID code and the stored ID code do not match when collated in response to the stop command to stop the engine of the vehicle.

* * * * *